United States Patent
McKeegan, Jr. et al.

[11] Patent Number: 5,860,346
[45] Date of Patent: Jan. 19, 1999

[54] APPARATUS FOR CUTTING AND ASSEMBLING MUNTINS

[76] Inventors: John McKeegan, Jr., 45866 Denise Dr., Plymouth, Mich. 48170; Rodney A. Bracy, 11805 Davis Rd., Middleville, Mich. 49330

[21] Appl. No.: 680,507

[22] Filed: Jul. 8, 1996

Related U.S. Application Data

[63] Continuation of Ser. No. 293,799, Aug. 22, 1994, abandoned.

[51] Int. Cl.⁶ .................................................. B32D 19/08

[52] U.S. Cl. ......................... 83/471.3; 83/471.1; 83/473; 83/485

[58] Field of Search ............................... 83/471.1, 471.3, 83/473, 485, 877, 878

[56] References Cited

U.S. PATENT DOCUMENTS

| | | | |
|---|---|---|---|
| 4,640,161 | 2/1987 | Kurk | 83/471.1 |
| 4,969,380 | 11/1990 | Halligan | 83/878 |
| 5,176,060 | 1/1993 | Thornton | 83/471.3 |

*Primary Examiner*—Maurina T. Rachuba
*Assistant Examiner*—Sean A. Pryor
*Attorney, Agent, or Firm*—Arnold S. Weintraub

[57] ABSTRACT

A muntin strip miter cutting apparatus for cutting muntin strips into muntin sections and assembly of muntin sections into muntin lattices. The apparatus has at least one muntin cutting blade which cuts muntin strips to produce mitered muntin sections. A piercing system pierces the muntin sections to provide apertures to assist with final assembly. The muntin sections are assembled with keepers at an assembly station to produce muntin lattices which are inserted between two or more panes of glass.

6 Claims, 4 Drawing Sheets

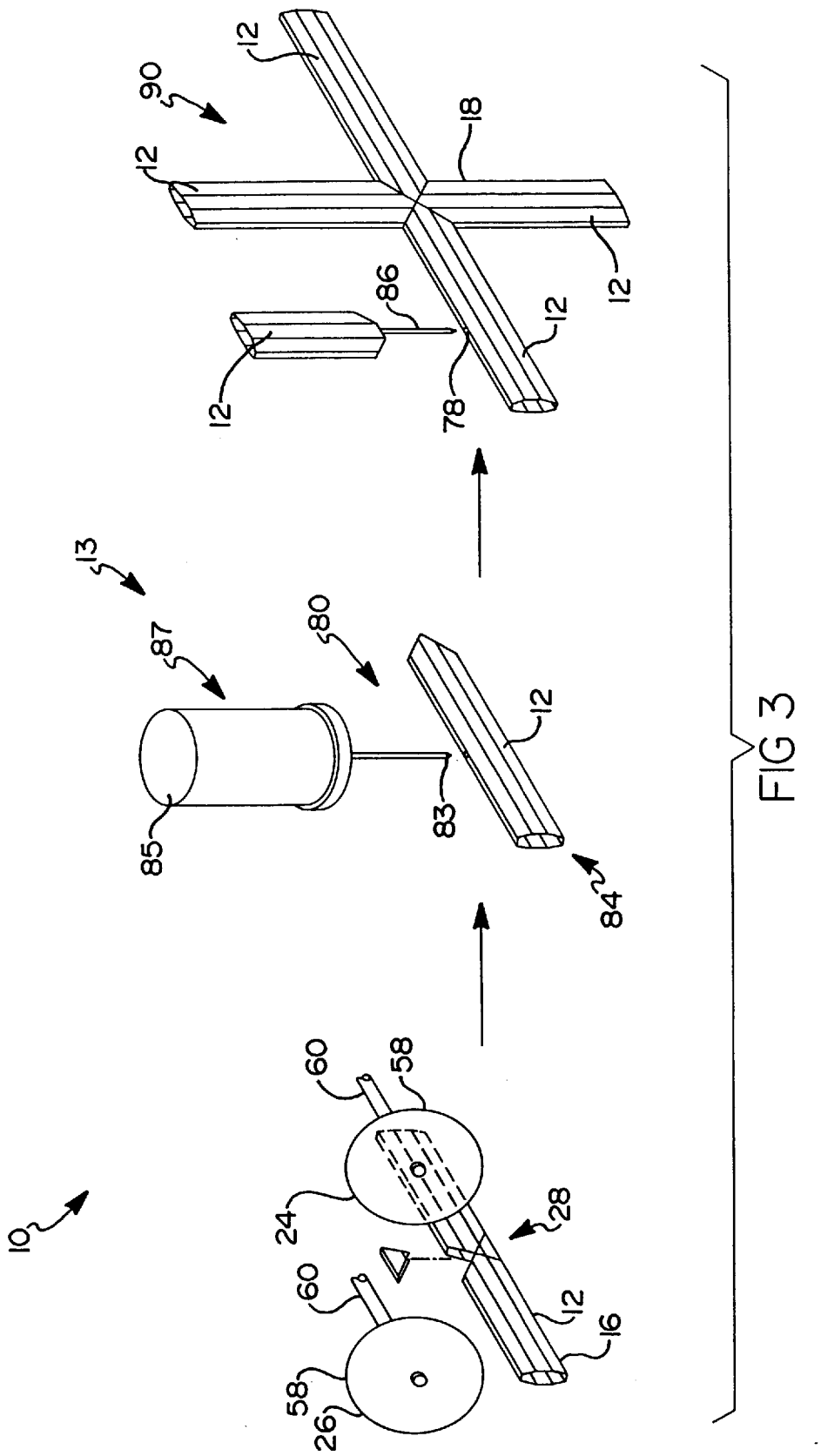

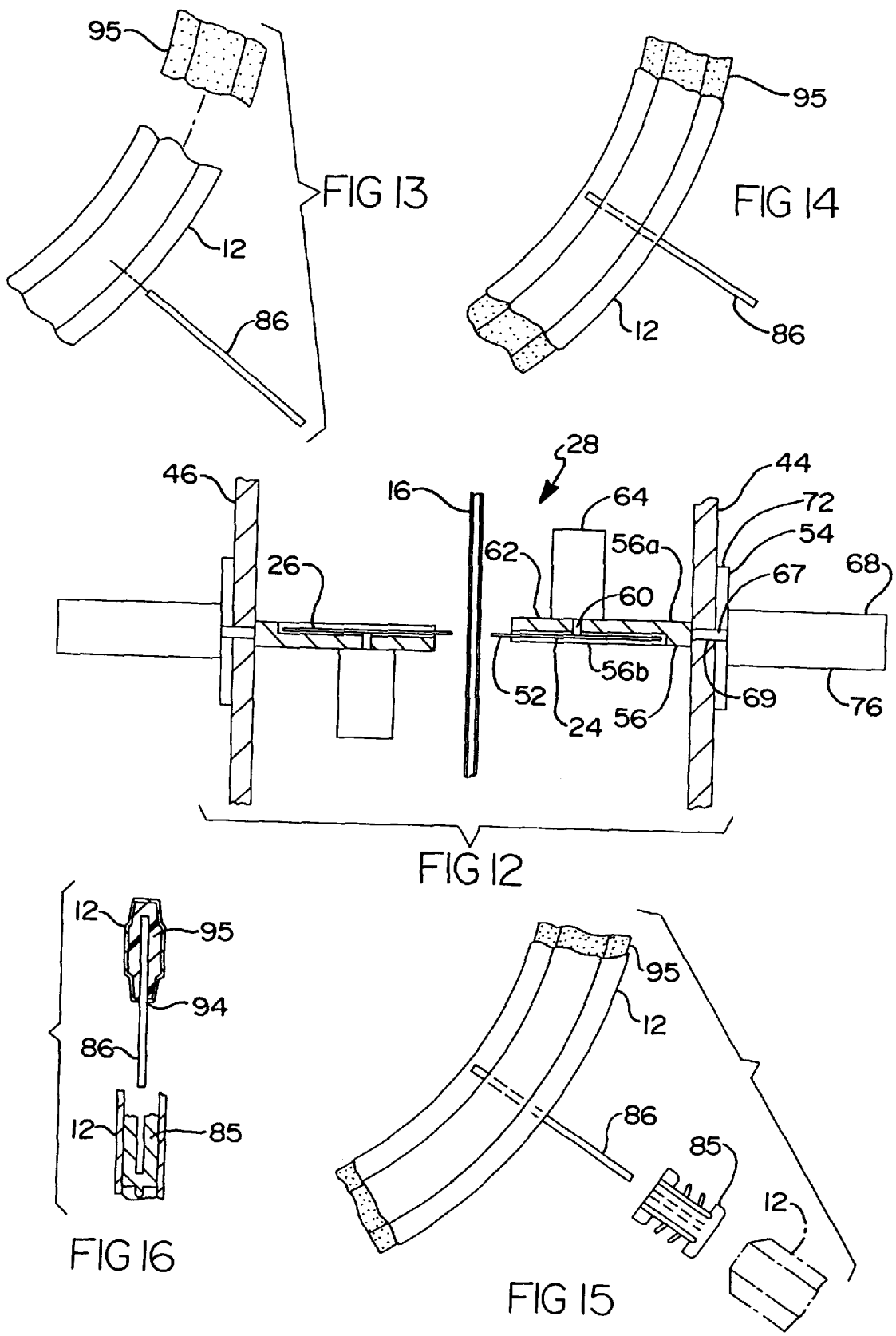

APPARATUS FOR CUTTING AND ASSEMBLING MUNTINS

This is a continuation, of application Ser. No. 08/293,799, filed Aug. 22, 1994, now abandoned.

BACKGROUND OF THE INVENTION

I. Field of the Invention

The present invention relates to apparatus for cutting muntin strips. More specifically, the present invention relates to apparatus for severing and mitering muntin strips and connectors for enabling the assembly thereof.

II. Description of the Prior Art

Traditionally, muntins or muntin strips have been used as decorative dividers or spacers between or outside panes of glass used for windows and doors. The muntins render the panes of glass aesthetically appealing. Because the muntins are frequently utilized between glass panes, they must present a flat mating surface to prevent the glass from seating against them. The flat surface is reasonably easy to sustain if the muntins are all aligned in a single direction. However, it becomes more difficult to sustain the flat mating surface at an intersecting joint of two muntins laid out in different directions or in other directional configurations.

Another common problem is the separation of the muntins which may occur at the intersecting joints over a period of time. This destroys the designs created with the muntins and the aesthetic quality provided to the windows by the placement of the muntins.

Several methods for assembling muntins to provide flat and strong intersecting joints are known. For example, muntin sections have been welded together to create a solid grid-type lattice structure, and then ground at the weld to eliminate rough surfaces caused by the weld. However, the welded strips, although they are structurally solid, create other problems. Glass panes, whether in a window or a door, expand in warm temperatures and contract in cold temperatures. To accommodate for this expansion and contraction, the muntins must be flexible. The welded muntin grids tend to be inflexible, which causes the glass panes to eventually crack. Also, the grinding of the weld does not produce consistently flat surfaces at the weld. This promotes stress on the glass panes. Further, the heat from welding occasionally causes the muntins to warp, which also causes stress on the glass panes.

Thus, other methods and devices have been developed to provide muntin grid assemblies that are reasonably solid and flexible. A typical example of this is the keeper developed by Allmetal, Inc. of Itasca, Ill. The Allmetal keeper is a plastic keeper or connector which is used to join muntin sections wherein the plastic keeper is installed in a first muntin section. Then, second, third, fourth, etc. muntin sections are mounted onto the keepers to form the grid.

An alternate keeper is that developed by Hygrade Metal Moulding Manufacturing Corp., Farmingdale, N.Y. The keeper sold by Hygrade system has a configuration different from that developed by Allmetal but is used and installed in a first muntin section with second, third, fourth, etc. muntin sections being installed thereonto, similarly to that of the Allmetal keeper.

Although the keepers provide structured flexibility, the solidity that is sought and the flexibility in lattice design are limited because of the shape of the joining ends of the muntin sections. The ends of the muntin are commonly square cut, as needed, to mate flush against another muntin. However, problems arise when muntin sections are not shaped to receive a square cut. The square or flush cut has a tendency to rock or separate from a flush fit during both assembly and use, even though the muntin section is seated on a plastic keeper. The rocking may cause bent edges which, if not caught during inspection, may contact the glass, thus, causing stress points on the panes of glass. Also, the joint may come apart during use, destroying the aesthetic appearance of the lattice.

Hygrade Metal, in addition to developing keepers, has attempted to address the above problem by notching muntin sections which are used in crossbar assemblies. The notched muntins are interlaced one on top of the other with the notches facing each other. In most cases, the notches permit the two muntins to merge to the thickness of one muntin. However, if there is no exact merger, the intersecting surfaces are not flat. Again, this provides stress on the glass pane. Also after assembly and in use, the expansion and contraction of the glass and metal due to changes in temperature causes the intersecting muntins to separate and the glass to contact the muntin, thus, creating stress on the glass panes.

It is also noteworthy that the assembly process generally used to assemble the muntins involves cutting the muntin sections with a single stationary blade or cutter which produces a square cut, or by routing. Routing leaves large burrs which present assembly problems if not removed. To obtain an angle cut, the muntin is positioned at a desired angle and then cut by the single blade. The muntin sections are next either punched with a hole or are notched. The punched and notched muntin sections are moved to an assembly station where an assembler assembles the notched pieces and/or inserts keepers in the punched holes and assembles the muntins together.

A single blade or cutter is usually operated by an operator who positions the muntin strips and presents them to the cutter. This operation is slow, time consuming and labor intensive, and it does not assure consistent, high quality parts. Routed muntins, on the other hand, leave burrs which must be ground to secure a good fit. This, again, is time-consuming and labor intensive. Because inconsistency and the other problems tend to result in insulated windows of questionable quality or longevity, an apparatus and method of producing consistent muntin sections and high quality muntin assemblies in a shorter time period and at a reduced cost is highly desirable.

SUMMARY OF THE PRESENT INVENTION

In a first aspect hereof, the present invention provides an apparatus for cutting muntin strips. The apparatus hereof generally comprises:

(a) a housing; and
(b) at least one cutting station for cutting and/or mitering a muntin strip disposed in the housing, the cutting station comprising:
  (i) at least one cutting blade;
  (ii) means for rotatably driving the blade;
  (iii) means for translating the blade into contact with a muntin strip; and
  (iv) means for indexing the blade to enable mitering of the strip.

The present apparatus also includes means for feeding to and positioning a muntin strip at the cutting station.

Preferably, the cutting station includes a pair of opposed blades, each having associated means for translating, indexing and rotatably driving. The opposed blades are rotatable and are angularly positionable to cut the muntin vertically or at any other desired angle. The cutting blades are preferably positioned automatically by pneumatic or electronic means.

The means for feeding and positioning the muntin strips includes a clamping system which clamps the muntin in position at the cutting station during the cutting process. The clamping system is preferably a pneumatic clamping device.

The muntin strip may be fed to and through the cutting station manually or automatically.

In another aspect hereof, the present invention provides a keeper which pierces the muntin section to enable easy assembly of two or more muntin sections. After the cutting, the keeper is emplaced by piercing the muntin therewith to enable joining of other muntin sections thereto.

A muntin lattice is assembled using the keepers hereof or other keepers. The type of cut or miter, the pierced hole and the type of keeper cooperate to enable various muntin lattice assembly shapes such as right angle sections or flared variable angle sections. After the muntin lattices are assembled, they may be installed into or onto the windows.

The present invention will be better understood with reference to the following detailed discussion and to the accompanying drawings, in which like reference numerals refer to like elements and in which:

BRIEF DESCRIPTION OF THE DRAWINGS

FIG. 3 is a perspective view of an assembly system employing the present invention;

FIG. 12 is a cross-sectional view of a cutting apparatus of the present invention taken along line 12—12 of FIG. 2;

FIG. 13 is a partial exploded view of a seating key and pin in accordance with the present invention;

FIG. 14 is a partial plan view of the assembled seating key pin and muntin section in accordance with the present invention;

FIG. 15 is an exploded plan view of an assembly, a two-way keeper and a seating key in accordance with the present invention; and FIG.16 is a cross-sectional exploded view of an assembly, a two-way keeper and a seating key in accordance with the present invention.

DETAILED DESCRIPTION OF THE PREFERRED EMBODIMENTS

Figure 1:
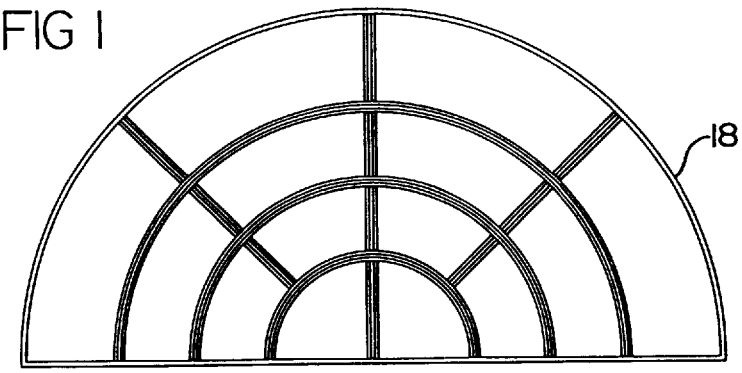
FIG. 1 is a front view of an exemplary muntin lattice assembly of the type enabled by the present invention.
Figure 2:
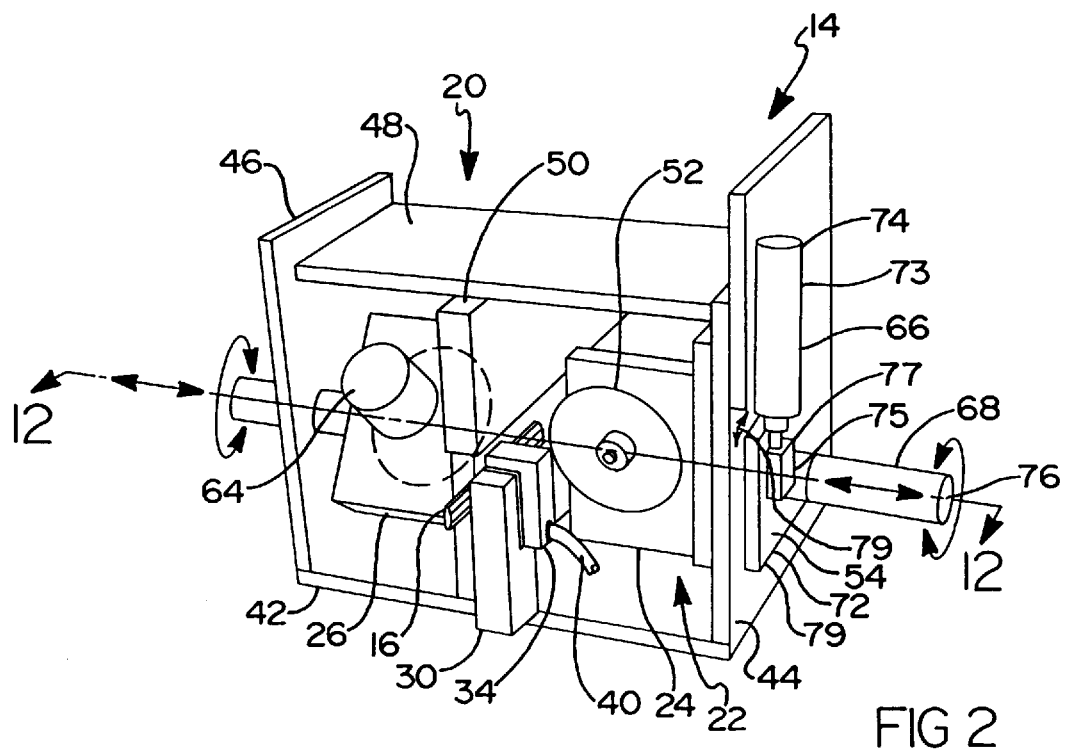
FIG. 2 is a perspective view of a cutting apparatus in accordance with the present invention.

Now with reference to the drawings, and in particular, FIGS. 2 and 3, there. is depicted therein an embodiment of a muntin cutting apparatus, generally depicted at 10, in accordance with the present invention. The apparatus 10 generally comprises: a housing 20 having a cutting station 14 disposed therein for cutting muntin strips 16 into muntin sections 12. The apparatus 10 may be used conjointly with a piercing station 15 and an assembly station 17 for assembling muntin sections 12 into muntin lattices 18, or independently thereof.

The cutting station 14 includes at least one cutting portion 22. Preferably, the cutting station 14 comprises a first cutting portion 24 and an opposing second cutting portion 26 aligned with the first cutting portion 24 and cooperable therewith. The cutting station 14 further comprises means 30 for translating and positioning muntin strips within the cutting station 14. A muntin strip is disposed between and is aligned with the cutting portions 24, 26 for cutting the strip into sections.

As shown, the housing 20 includes a support frame 32 constructed around the cutting portions 24, 26, as discussed in greater detail below.

The means 30 for translating and positioning the muntin strip 16 preferably includes a clamping unit 34 which is used to hold the muntin strip 16 in place while it is being cut. The clamping unit 34 includes a seat portion 36 for seating the muntin strip 16 and a cover or cover portion 38 which urges against the seat portion 36 and the muntin strip 16 to hold and clamp the muntin strip 16 stationary during the cutting operation. Means, such as a hydraulic fluid or air (not shown), is operatively connected to the cover 38 via a conduit or hose and is used to impart clamping pressure to the cover portion 38 in a well-known manner.

While the means for operating is preferably a pneumatic system (not shown), alternatively, an electrical system may be used to apply the clamping pressure.

While the clamping unit 34 holds the muntin strip 16 in place, the cutting portions 24, 26 cut the muntin strip 16 into the sections 12 which are then assembled at subsequent stations 15, 17 that are described in greater detail below.

The cutter housing 20 may be mounted on a stand (not shown). It also may be mounted on a table (not shown) in combination with various assembly systems.

The housing support frame 32 includes a base plate 42 which has opposing end walls 44, 46 attached thereto. A top plate 48 is disposed above and essentially parallel to the base plate and is attached to the end walls 44, 46.

A medial support 50, parallel to the end walls 44, 46, is disposed between the base plate 42 and the top plate 48. The medial support 50 provides support for the muntin clamping unit 34. The base plate 42, end walls 44, 46, top plate 48 and medial support 50 are preferably made from steel, but may be made from other metal such as aluminum. Also, the above-described elements of the support frame 32 may be attached together by fasteners such as screws or the like.

The cutting portions 24, 26 are angularly indexable and are disposed within the housing 20. The first cutting portion 24 is removably mountable to one end wall 44 and the second cutting portion 26 is removably mountable to the second end wall 46 by fasteners such as screws or the like (not shown). The cutting portions 24, 26 are installed opposing each other and are axially aligned. The cutting portions 24,26 are each constructed in a similar manner and therefore only one will be discussed.

As shown in FIGS. 2 and 12, each cutting portion 24 or 26 includes a rotary cutting blade 52 and means 54 for angularly indexing the rotary cutting blade 52. The means 54 positions the rotary cutting blade 52 for a desired cut on the muntin strip 16.

The rotary cutting blade 52 is mounted on a plate 56 which is, in turn, attached to the means 54 by welding or the like. The plate 56 has a first surface 56*a* and a second surface 56*b*. The cutting blade 52 is removably mounted onto a rotary axle 60 which is disposed on the second surface 56*b* of the plate 56. The rotary axle 60 extends through an aperture 62 formed in the mounting plate 56, the blade 52 being mounted thereonto by any suitable mode.

The rotary axle 60 is removably attached to means 64 for rotatably driving the rotary axle 60 and cutting blade 52. The means 64 is disposed on the first surface 56*a* of the plate 56 and may comprise any suitable drive, such as an electric motor or the like.

The cutting blade 52 may be an abrasive cutting wheel or a metal cutting wheel or circular saw or other type cutting blade. Preferably, a high speed cutting blade 52 is used so as to prevent burning of stock and to provide for a clean edge after cutting. The high speed cutting blade 52 substantially eliminates or reduces burring at the cut edges.

As noted, the means 64 for rotatably driving the cutting blade 52 is preferably an electric motor, but may be a hydraulic or pneumatic motor. These motors are commercially available and known to those skilled in the art.

The rotary cutting blade 52 is rotatably indexed to multiple positions to provide a plurality of cutting angles. The preferable cutting angle positions for the cutting blade 52 are vertical and 45° and 135°. The rotary cutting blade 52 is also adapted to be translated horizontally via a means 68 for translating. The means 68 for translating moves the blade through and away from the muntin strip 16 while the cutting blade 52 is rotating.

The means 54 for angularly indexing the cutting portions 24, 26 also positions the rotary cutting blade 52 at the proper cutting angles before the rotary cutting blade 52 is translated to, through and away from the muntin strips 16. The means 54 preferably includes a rotary indexing system 66 for setting the plurality of cutting angles for the rotary cutting blade 52 before translating the rotary cutting blade 52 to and from the cutting station 14.

The rotary indexing system 66 includes a shaft 67 which extends between the rotary cutting blade 52 and the means for translating 68. The shaft 67 extends through an aperture 69 provided in the wall 44. A link plate 72 is slidingly mounted onto the shaft 67 for indexing the shaft 67. The link plate 72 is actuated by first means 73 for moving. The first means 73 comprises a first cylinder 74, mounted on the end wall 44, pivotally connected to the link plate 72 via a pivot pin.75 and a mounting block 77. The first cylinder 74 actuates the link plate 72 to index the shaft 67 and position the rotary cutting blade 52 at the desired cutting angle.

When the cylinder 74 is actuated, the cylinder rod is extended or retracted, causing the mounting block 77 and, thus, the link plate 72 to move in the directions shown by the arrow 79. Because the plate 72 is fixed to the shaft 67, rotation thereof is imparted thereto, thus causing the cutting blade 52 to index. The indexing angle of the cutting blade 52 is preferably determined by a fluid control system (not shown) which is in fluid communication with the first cylinder 74. The control system (not shown) causes the fluid to activate the first cylinder 74 to the desired indexing angle. Alternatively, the first cylinder 74 may be pre-set to desired indexing angles by pre-setting the first cylinder 74 in a manner well-known to those skilled in the art.

The means 68 for translating, preferably, includes second means 77 for moving also mounted to the link plate 72. The second means 77 comprises a second powered cylinder 76 removably mounted to the link plate 72 and fixedly connected to the shaft 67. In use, after the first cylinder 74 is used to position the rotary cutting blade 52, the second cylinder 76 translates or moves the cutting blade 52 into position to cut the muntin strip 16. When the cutting operation is complete, the second cylinder 76 retracts the rotary cutting blade 52 from the muntin strips 16.

The first cylinder 74 and the second cylinder 76 are preferably pneumatic cylinders, but may be hydraulic cylinders. The cylinders 74, 76 are commercially available and are known to those skilled in the art.

Figure 5:
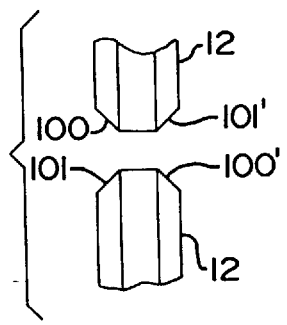
FIG. 5 depicts a second muntin cut using the apparatus hereof.
Figure 9:
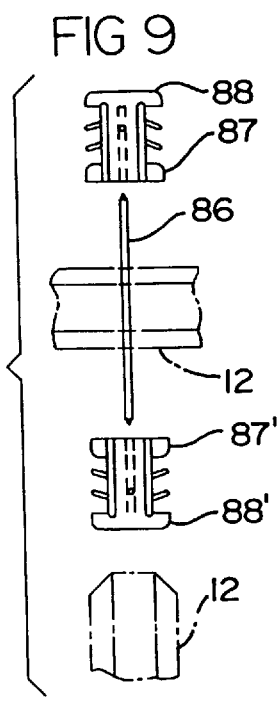
FIG. 9 is an exploded plan view for a two-way keeper in accordance with the present invention.

In use, and assuming opposed cutters, the cutter is vertically oriented and translated via the cylinder 76 into a. cutting position where it cuts or severs the muntin strip 16 into two pieces and is then retracted. Then, depending on the desired configuration, the cutters are rotated to the desired angle. For example, if the configurations of FIGS. 5 and 9 are desired, the severed sections are separated a pre-set distance by suitable means (not shown) associated with the means for feeding and positioning. Then one cutter makes a first transverse cut 100, 100', is then retracted, and the second cutter makes an opposite transverse cut 101, 101'.

Figure 4:
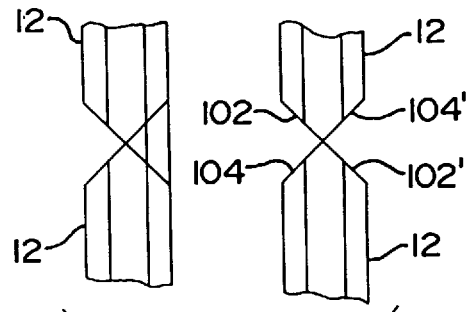
FIG. 4 is an assembly view of a first type of muntin cut achieved using the cutting apparatus and keeper hereof.
Figure 7:
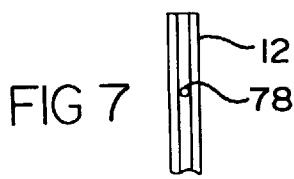
FIG. 7 is a partial side view of an end section of a pierced muntin.
Figure 8:
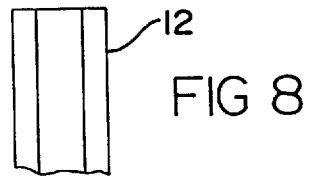
FIG. 8 is a partial plan view of an end section of a third type of muntin cut enabled by the apparatus hereof.
Figure 10:
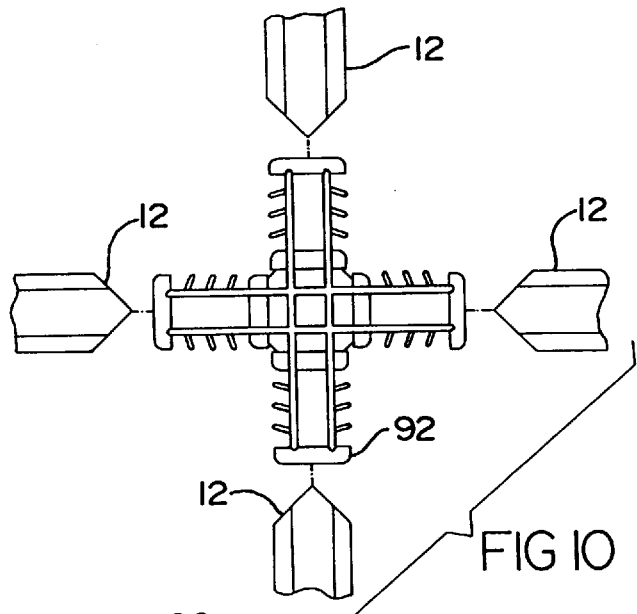
FIG. 10 is an exploded plan view of an assembly and a four-way keeper in accordance with the present invention.
Figure 11:
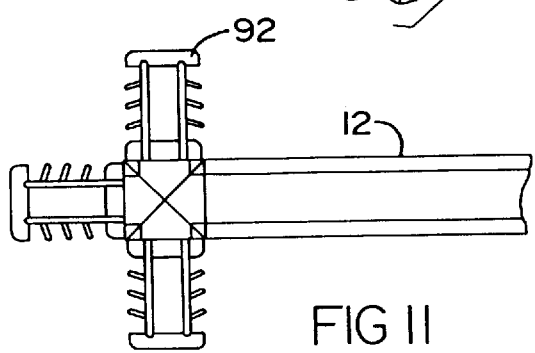
FIG. 11 is a partial plan view of an assembly of a four-way keeper, a muntin section using the cut of FIG. 8.

If the cut of FIG. 4 and FIG. 10 is desired, the cutting blade 52 first severs, and then, because of the clamping pressure, the severed sections remain in place. Afterward, and as described above, each cutter makes a transverse cut 102, 102' and 104, 104', respectively.

After cutting, a plurality of muntin sections 12 may be joined into a lattice. Thus, the present invention further contemplates means 13 for assembling muntin sections 12 into the muntin lattice 18. As shown in FIGS. 1, 9, 10 and 11, an aperture 78 is formed in a muntin section 12 to permit mounting of a keeper 85. The keeper 85 includes a seating pin 86 which projects into the aperture 78, as described below. The aperture 78 is formed by piercing the muntin section 12. The piercing is accomplished via a piercing system 80.

The piercing system 80 includes a piercing device 82 which pierces the muntin sections 12 disposed at the piercing station 15. The station 15 positions and holds the muntin sections 12 during piercing. The piercing device 82 includes a piercing point 83 and means 85 for driving the point into and out of the muntin 12 to form the aperture 78.

The piercing device 82 is preferably a pneumatically operated device, but may be operated hydraulically. The piercing device 82 forms the aperture 78 in the muntin section 12 for registering apertures formed across the width of the muntin section 12 for receiving a seating pin 86. These piercing devices are well-known, such as that manufactured and sold by McKeegan Equipment and Supply of Plymouth, Mich. The seating pin 86 is inserted into aperture 78 of the muntin section 12 with a portion of the pin 86 extending out of one or both sides of the muntin section 12.

As shown in FIGS. 13, 14, 15 and 16, the piercing device 82 also forms an aperture 94 in one side of the muntin section 12 and in a seating key 95, disposed within the muntin section 12. The key 95 receives the seating pin 86. As shown, a portion of the seating pin 86 extends outwardly from only one side of the muntin section 12, while the remainder of the pin is seated in the seating key aperture. Because the seating pin 86 receives a keeper 85 on only one end, the seating key 95 is used to anchor the other end of the pin 86 within the muntin section 12, as described in greater detail below.

The seating key 95 is preferably made from a flexible material such as plastic or rubber. The seating key 95 is adapted to be inserted into and conform to the muntin section 12. The seating key 95 may be inserted prior to or after cutting the muntin sections 12. Preferably, the seating key 95 is inserted after cutting the muntin section 12 to reduce the size of the muntin section 12 that will require an inserted key 95.

The seating key 95 is preferably shaped by an extrusion device commonly known to those skilled in the art, to conform to the cross-section of a muntin section 12. The muntin strips 16 may be formed around the key 95 before being cut into muntin sections 12. Alternatively, the seating key 95 may be installed into the muntin strip 16 before cutting or the muntin section 12 after cutting by inserting the seating key 95 into the strip 16 or section 12 manually or mechanically by an insertion device commonly known to those skilled in the art.

The seating key 95 allows the muntin sections 12 to be assembled as T-sections while maintaining a snug fit of the section 12 at the joint. Also, using a flexible seating key 95, the muntin section 12 can be formed to any desired shape, such as a circle. This provides the freedom to create varied muntin lattice 18 designs.

The present invention is particularly advantageous in that it eliminates the need for notching out muntin sections when forming 45° intersections, as well as eliminating the need for four piece intersections. Likewise, as shown in FIG. 6, because of the overlapping upon engagement, the present invention enables formation of any desired configuration.

The cutting apparatus 10 and the piercing system 80 preferably have their operations controlled by an electronic programmable controller system (not shown) which is commercially available from any controller manufacturer, such as Allen-Bradley Co. of Michigan. In the alternative, a pneumatic controller system, such as those commercially available from Industrial Air & Hydraulic Co. of Michigan, or a hydraulic controller system, such as those commercially available from Pabco Fluid Power Co. of Michigan, may be used.

Figure 6:
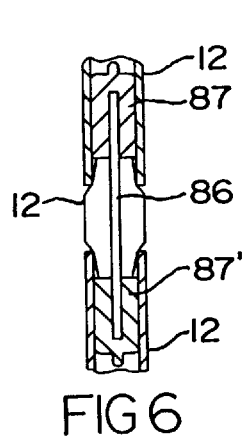
FIG. 6 is a partial view showing the mounting of one muntin section to another using the keeper hereof and which uses the cut of FIG. 5.

As shown in FIGS. 6 and 9, there is depicted a keeper or joiner 88 in accordance with the present invention. The muntin sections 12 and the keepers 92 or the pin mounted keeper 88 hereof are assembled to create the desired muntin lattice 18 at the station 17.

The pin mounted keeper 88 comprises a pin 86' and at least one tine body 87 or 87' mounted or journalled onto the pin 86'. Preferably, a pair of spaced apart, opposed tine bodies 87, 87' are mounted onto the pin 86. In use, the pin is inserted into the aperture 78 or registering apertures depending on the desired configuration. At least one of the tine bodies is then journalled onto the end or ends of the pin 86. The cut muntin end is then slid onto the tine body and has its cut end abutted against the conventional embossed portion of an engaging muntin section 12 (FIG. 3).

The present invention provides for production of high quality, well-assembled lattice matrices which retain their assembled configurations for extended periods of time, eliminate muntin section separation, and thus reduce any stresses on multi-layered glass panes. This provides for a long-lasting, aesthetically pleasing window or door. The apparatus provides for multiple angle miter cutting of muntin strips and close tolerance fitting.

Having thus described the present invention, what is claimed is:

1. An apparatus for miter cutting muntin strips comprising:
   (a) at least one cutting blade;
   (b) means for rotatably driving the blade;
   (c) means for angularly indexing the blade with respect to a muntin strip by rotation about a horizontal axis, the means for angularly indexing the cutting blade comprising:
   (i) a mounting plate configured to receive a cutting blade;
   (ii) a shaft removably attachable to the mounting plate;
   (iii) a link plate slidingly mounted on the shaft configured to index the shaft;
   (iv) first means for moving the link plate;
   (d) means for horizontally translating the blade into, through and out of contact with a muntin strip and being cooperable with the means for angularly indexing and operatively connected thereto; and
   wherein the shaft, the link plate, the mounting plate and the first means for moving cooperate to index the cutting blade at multiple cutting angles.

2. The apparatus of claim 1, wherein the means for translating the rotary cutting blade comprises:
   a second means for moving, the second means configured to horizontally translate the cutting blade into and from a muntin strip, the second means being mounted to the link plate and removably attachable to the shaft.

3. An apparatus for cutting muntin strips comprising:
   (a) a first cutting blade and a second cutting blade disposed in opposed relation to the first cutting blade, the first cutting blade and the second cutting blade having a common horizontal axis of translation;
   (b) means for rotatably driving the first cutting blade into and out of contact with a muntin strip;
   (c) means for rotatably driving the second cutting blade;
   (d) means for angularly indexing the first cutting blade with respect to a muntin strip by rotation about the common horizontal axis of translation;
   (e) means for angularly indexing the second cutting blade;
   (f) means for translating the first cutting blade into, through, and out of contact with a muntin strip along the common horizontal axis of translation, the means for translating the first blade being cooperable with the means for angularly indexing the first blade and operatively connected thereto; and
   (g) means for translating the second cutting blade.

4. The apparatus of claim 11 which further comprises:
   a housing, the blades being disposed in the housing, the means for driving, the means for indexing and the means for translating being mounted on the housing.

5. An apparatus for miter cutting muntin strips, the apparatus comprising:
   (a) a pair of opposed cutting blades, the blades having a common horizontal axis of translation;
   (b) means for rotatably driving each of the pair of cutting blades;
   (c) means for angularly indexing each of the pair of cutting blades with respect to a muntin strip to be cut, and comprising a link plate for setting a cutting angle by rotation of the blade about the horizontal axis; and
   (d) means for horizontally translating each of the pair of cutting blades into, through and out of contact with a muntin strip.

6. The apparatus of claim 5 wherein the means for horizontally translating the rotary cutting blade comprises:
   a second means for driving, the second means configured to horizontally translate the cutting blade into and from a muntin strip, the second means being operatively connected to the means for angularly indexing.

* * * * *